(12) United States Patent
Ogata et al.

(10) Patent No.: US 6,531,100 B1
(45) Date of Patent: *Mar. 11, 2003

(54) PHOTOCATALYST-SUPPORTING BODY AND PHOTOCATALYTIC APPARATUS

(75) Inventors: Shiro Ogata, Kanagawa-ken (JP); Kazuhiko Sonomoto, Saitama-ken (JP)

(73) Assignee: Hitachi Metals, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/175,412

(22) Filed: Oct. 20, 1998

(30) Foreign Application Priority Data

| Oct. 20, 1997 | (JP) | 9-306461 |
| May 28, 1998 | (JP) | 10-147508 |
| Jul. 17, 1998 | (JP) | 10-203675 |
| Aug. 13, 1998 | (JP) | 10-229105 |

(51) Int. Cl.⁷ .................. B01J 19/08; B01J 21/06; B01J 35/02
(52) U.S. Cl. .............. 422/177; 422/180; 422/186; 422/186.03; 502/507.12; 502/527.14; 502/527.17; 502/522; 502/350
(58) Field of Search .................. 422/177, 186.03, 422/180, 222, 186; 502/527.12, 827.13, 527.14, 527.15, 527.16, 527.17, 439, 522, 350

(56) References Cited

U.S. PATENT DOCUMENTS 5,668,076 A * 9/1997 Yamaguchi et al. ........ 502/343
5,778,664 A * 7/1998 Yanata et al. ............ 422/186.3

FOREIGN PATENT DOCUMENTS

| EP | 0 684 075 A | | 11/1995 |
| EP | 846494 | * | 6/1998 |
| JP | A 5-309267 | | 11/1993 |
| JP | A 8-196903 | | 8/1996 |
| JP | A 8-215577 | | 8/1996 |
| JP | A 8-246192 | | 9/1996 |
| JP | A 9-206537 | | 8/1997 |
| JP | A 9-262481 | | 10/1997 |

OTHER PUBLICATIONS

DATABASE WPI, Section Ch, Week 9737, Derwent Publications, Ltd., London, GB; Class D22, AN 97–397666 XP002089175 & JP 09 173865 A (Toshiba Lightech KK), Jul. 8, 1997 *abstract*.

DATABASE WPI, Section Ch, Week 9736, Derwent Publications, Ltd., London, GB; Class A85, AN 97–390950 XP002089176 & JP 09 171707 A (Toshiba Lightech KK), Jun. 30, 1997 *abstract*.

(List continued on next page.)

Primary Examiner—Hien Tran
(74) Attorney, Agent, or Firm—Sughrue Mion, PLLC

(57) ABSTRACT

A photocatalyst-supporting body comprises a substrate, a porous layer fixedly disposed on at least one surface of the substrate, and a semiconductor photocatalyst layer deposited on the surface of the porous layer. The porous layer is made of fine particles or porous nonwoven metal fabric. Since the semiconductor photocatalyst is bound to the substrate through the porous layer, the area of the photocatalytic surface is increased and the contaminants in a fluid flow being treated adequately contact the photocatalytic surface thereby to enhance the photocatalytic efficiency. The photocatalytic efficiency is further improved by making the porous layer dense (rough) in the vicinity of the surface of the substrate and rough (dense) with increasing distance from the surface of the substrate.

10 Claims, 11 Drawing Sheets

OTHER PUBLICATIONS

DATAABASE WPI, Section Ch, Week 9610, Derwent Publications Ltd., London, GB; Class D22, AN 96–092314, XP002089177 & JP 08 001010 A (Fujishima A), Jan 9, 1996 *abstract*.

DATABASE WPI, Section Ch, Week 9750, Derwent Publications, Ltd., London, GB; Class J04, AN 97–544511 XP002089174 & JP 09 262483 A (Toshiba Lightech KK), Oct. 7, 1997 *abstract*.

* cited by examiner

PHOTOCATALYST-SUPPORTING BODY AND PHOTOCATALYTIC APPARATUS

BACKGROUND OF THE INVENTION

The present invention relates to a photocatalyst-supporting body for conversion and removal of organic or inorganic substances in a fluid (gas or liquid) stream by using a semiconductor photocatalyst, and an apparatus utilizing the photocatalyst-supporting body.

Ever increasing use of petrochemicals has caused serious complex pollution or contamination of living environment by noxious substances. To avoid the pollution and contamination problems, a fluid purification method utilizing a photocatalyzed oxidative decomposition of pollutants and contaminants by a semiconductor photocatalyst has been proposed.

For example, an apparatus or instrument having as a part thereof a substrate supporting a semiconductor photocatalyst is placed in a flow path of a fluid stream containing noxious inorganic or organic substances so as to bring the noxious substances into contact with the semiconductor photocatalyst thereby to decompose the noxious substances. To enhance the photocatalytic efficiency, it is needed to increase the photocatalytic surface area and to sufficiently activate the semiconductor photocatalyst with an electromagnetic wave having a wavelength capable of activating the photocatalyst.

Several proposals have been made on the method of increasing the area of the photocatalytic surface and the method of forming a photocatalyst layer. Japanese Patent Laid-Open No. 5-309267 discloses a photocatalyst-supporting body comprising a substrate made of ceramics, glass, metals and plastics and a photocatalyst powder bound to the substrate by a metal oxide derived from a corresponding metal oxide sol. Japanese Patent Laid-Open No. 8-196903 discloses a photocatalyst-supporting body comprising a porous substrate made of ceramics, glass and metal, and a titanium oxide layer with fine pores. However, although the photocatalytic surface area is increased, the proposed photocatalyst-supporting bodies are still insufficient in activating the semiconductor photocatalyst by electromagnetic wave and providing a sufficient contact of a fluid stream with the semiconductor photocatalyst.

Japanese Patent Laid-Open No. 8-246192 discloses a photocatalyst-supporting body comprising a titanium or titanium alloy plate and an oxide layer containing anatase titanium oxide. However, the titanium or titanium alloy plate is very expensive and rigid to have a poor formability. Japanese Patent Laid-Open No. 9-206537 discloses a drying device capable of decomposing food oil to carbon dioxide and water, in which the photocatalyst is coated on a filter made of a punching metal.

To mount a photocatalyst-supporting body into an apparatus or instrument as a part thereof, the substrate supporting the semiconductor photocatalyst is preferred to be easily worked by press working, etc., and preferred to have a good flexibility to ensure easy bending and folding. However, the substrates, in particular those made of inorganic materials conventionally used have been poor in workability and flexibility thereby to limit the field to which the photocatalyst-supporting body is applied.

Japanese Patent Laid-Open No. 8-215577 discloses to support the photocatalyst on a meshed structure having an opening of 0.5 mm or smaller to improve the formability of the photocatalyst-supporting body. The meshed structure is made of metal, metal oxide, plastic or natural fiber. However, since the photocatalyst is coated directly on the meshed substrate, the photocatalytic surface area is small thereby failing to exhibit a sufficient photocatalytic efficiency.

OBJECT AND SUMMARY OF THE INVENTION

Accordingly, an object of the present invention is to provide a photocatalyst-supporting body comprising a substrate and a photocatalyst disposed thereon, in which the surface area of the substrate is increased to ensure a uniform activation of the semiconductor photocatalyst and an enhanced contact of a fluid stream with the semiconductor photocatalyst. The present invention also provides a photocatalyst apparatus utilizing such a photocatalyst-supporting body.

As a result of the intense research in view of the above objects, the inventors have found that the problems in the prior art can be solved by coating the surface of the substrate with particles in layer so that the particles are coated densely on the substrate and coated roughly with increasing distance from the substrate in the thickness direction or vice versa, fixing the coated particles on the substrate, and then supporting the photocatalyst on the fixed particles. The coated particles increase the surface of the substrate, and as a result thereof, increase the area of photocatalytic surface.

The inventors have further found that the above problems can be eliminated by supporting the photocatalyst on a porous layer, which is made of a non-woven wire fabric or metal particles, fixedly disposed on a substrate of a meshed structure.

Thus, in a first aspect of the present invention, there is provided a photocatalyst-supporting body comprising a substrate, a particle layer fixedly disposed on at least one surface of the substrate, and a semiconductor photocatalyst layer deposited on the surface of the particles of the particle layer, the particle layer either being roughly formed in the vicinity of the surface of the substrate and densely formed with increasing distance from the surface of the substrate or being densely formed in the vicinity of the surface of the substrate and roughly formed with increasing distance from the surface of the substrate in the thickness direction of the particle layer to increase the surface area of the substrate.

The particles of the particle layer, the particle layer either being roughly formed in the vicinity of the surface of the substrate and densely formed with increasing distance from the surface of the substrate or being roughly formed in the vicinity of the surface of the substrate and densely formed with increasing distance from the surface of the substrate in the thickness direction of the particle layer to.

In a second aspect of the present invention, there is provided a photocatalyst-supporting body comprising: (1) a substrate of a meshed structure made of a metallic material selected from the group consisting of stainless steel, aluminum, an aluminum alloy, titanium, a titanium alloy, copper and a copper alloy, the substrate being in the form of a flat plate or three-dimensional structure; (2) a porous layer securely disposed on at least one surface of the substrate, the porous layer being a nonwoven metal fabric or sintered metal particles, each made of a metallic material selected from the group consisting of stainless steel, aluminum, an aluminum alloy, titanium, a titanium alloy, copper and a copper alloy; and (3) a photocatalyst layer deposited on the porous layer.

In a third aspect of the present invention, there is provided a photocatalytic apparatus comprising: (1) a photocatalyst-supporting body, as defined above, having a flat plate shape; and (2) a pair of light sources for illuminating the photocatalyst-supporting body with light having a wavelength capable of activating a photocatalyst, pair of light sources being respectively disposed along the opposite sides of the photocatalyst-supporting body so that one of the light sources illuminates a front surface of the photocatalyst-supporting body and the other illuminates a back surface of the photocatalyst-supporting body.

DETAILED DESCRIPTION OF THE INVENTION

[1] First Photocatalyst-Supporting Body

Figure 1:
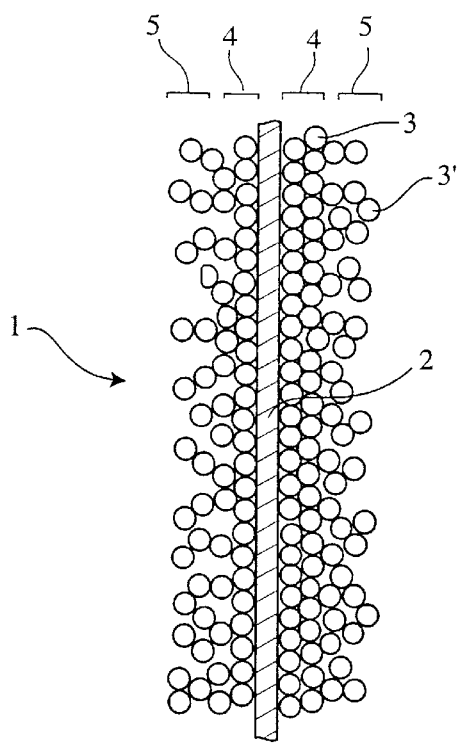
FIG. 1 is a schematic illustration showing a cross-sectional view of a first photocatalyst-supporting body of the present invention.

A first photocatalyst-supporting body of the present invention comprises a substrate, a particle layer fixedly disposed on the front, back or both surfaces of the substrate, and a semiconductor photocatalyst deposited on the surface of the particles and substrate. It is characterized, in particular, in the packing density (or porosity) gradient of the particle layer along the thickness direction. Namely, the particles are coated on at least one surface of the substrate densely in the vicinity of the substrate surface and roughly with increasing distance from the substrate surface, or vice versa.

As a result, in this photocatalyst-supporting body, a particle size of the particles is small in the vicinity of the surface of said substrate and becomes larger with increasing distance from the surface of the substrate.

The substrate for the first photocatalyst-supporting body is not particularly limited, and may be made of a wide range of materials such as ceramics, metals, organic polymers including synthetic resins, woods, papers, etc. in a form of plate and three-dimensional structures such as cube, rectangular solid, sphere, cylinder, etc. or any combination thereof. The substrate may be of dense structure with low air permeability, porous structure, honeycomb structure and surface-roughened structure.

The substrate may be a meshed structure made of fibrous material such as monofilament or twisted yarn of natural or synthetic fiber. When the photocatalyst-supporting body is mounted into an apparatus or instrument as a part thereof, the meshed structure is preferably a wire fabric or wire cloth. The material for metal wire may be iron, copper, titanium, stainless steel, aluminum alloy, zinc alloy, etc. These metal wires are preferable because the iron wire is less expensive, the copper wire is antibacterial, the titanium wire and stainless steel wire are highly anticorrosive and durable, and aluminum alloy wire and zinc alloy wire are highly anticorrosive and light in their weight.

For example, a wire cloth of Dutch weave (JIS G3555) or stranded weave (JIS G3555) made of small-gage stainless steel wires has a good mechanical strength and is suitable for constructing a part of an apparatus or instrument by stacking a plurality of wire cloths. In addition, when stainless steel particles are used as the particles for increasing the surface area of the substrate, a particle layer with a gradient structure mentioned above can be easily formed and a photocatalyst-supporting body with a good flexibility is obtained. Since the meshed structure has minute openings of about 1 $\mu$m to 2 mm, a photocatalyst-supporting body having a substrate of the meshed structure also serves as a filter. The thickness of the substrate is usually 200–400 $\mu$m. In addition, the substrates which will be described below may be also used as the substrate for the first photocatalyst-supporting body.

The particles for increasing the surface area of the substrate may be made of ceramics, metals, synthetic resins in the shape of sphere, flake, leaf, thin plate and irregular shape. The average particle size is preferably 5–400 $\mu$m. When the particles are bound to the substrate by sintering, baking, etc., the particles and the substrate are preferably made of the same material in view of their compatibility. When made of different materials, it is preferred to use a suitable binder to securely bind the particles to the substrate. In this case, it is preferred that the different materials have coefficients of linear expansion equal to or nearly equal to each other, or one of the materials has stretching properties comparable to the linear expansion of the other. The binder may be selected from an inorganic glass, a frit, a powder of metal such as Sn and Cu, a thermoplastic resin, etc.

The particles are coated in layer on the substrate by spray coating, dip coating or screen printing. The coating is repeated several times while gradually changing the concentration of the particles in the spraying or dipping liquid or gradually changing the particle size. In this manner, the particles are coated on the substrate densely in the vicinity of the substrate surface and roughly with increasing distance from the substrate surface or are coated on the substrate roughly in the vicinity of the substrate surface and densely with increasing distance from the substrate surface to provide a particle layer with a packing density gradient. Alternatively, the packing density gradient is obtained by repeating the screen printing while gradually changing the mesh size of screen with or without gradually changing the particle size.

The particle layer may be formed into a structure having a plurality of conical projections, pyramidal projections, frustum projections or ribs. Each of the projections and ribs has a cross-sectional area parallel to the substrate surface which decreases with increasing distance from the substrate surface in the thickness direction of the particle layer, thereby providing the structure of gradient packing density, namely, dense in the vicinity of the substrate surface and gradually made rough with increasing distance from the substrate surface. Such a structure may be obtained by the screen coating using a plurality of screens having concentric openings with the size diminishing from the first-used screen to the finally-used screen.

After forming the particle layer on the substrate, the coated product may be rolled at a rolling reduction of 2–50%, and then the coated particles are fixed to the substrate and bonded to each other by a suitable method according to the material of the particles. The binder, if used, forms bridging bonds between the substrate and the particles or between the particles to strongly fix the particles to the substrate. Since the bridging structure is resilient, the resultant photocatalyst-supporting body has a flexibility. When the particles are made of stainless steel, Ti or Cu, the bridging bonds are formed by a sintering at 700–1000° C., or at 300–400° C. when made of Al, for 1–10 hours in vacuum or hydrogen gas atmosphere without using the binder. The thickness of the particle layer is preferably 10–100 $\mu$m.

The photocatalyst may be deposited on the particles fixed to the substrate surface. Suitable photocatalyst deposition methods may be spray-coating and dip-coating of a sol of the semiconductor photocatalyst such as a $TiO_2$ sol. After drying, the semiconductor photocatalyst is securely bound to the particles by baking or sintering preferably at least at 50° C. and below 500° C.

The sol of the semiconductor photocatalyst may further contain an amorphous titanium peroxide (peroxytitanic acid) or titanium oxide in a dry weight ratio of 1:1 to 1:5 in terms of titanium based on the amount of the semiconductor photocatalyst, because the semiconductor photocatalyst is securely deposited on the particles at relatively lower temperature as taught by Japanese Patent Laid-Open No. 9-262481.

A small amount of Pt, Ag, Rh, $RuO_2$, Nb, Cu, Sn or NiO may be used to provide antibacterial properties and mildew resistance. To enhance the photocatalyzed oxidative/reductive decomposition of contaminants in the fluid stream, one or more adsorbents may be added. The adsorbents may include inorganic substances such as zeolite, silica (silicon dioxide), alumina, zinc oxide, magnesium oxide, rutile-type titanium oxide, zirconium phosphate, etc.; activated carbon of various types; porous phenol resins; and porous melamine resins.

When the particles, to which the semiconductor photocatalyst is bound, are made of a synthetic resin, the particles themselves may be decomposed by the semiconductor photocatalyst. To avoid this, the particles preferably have formed thereon a protective coating by spraying a hydrosol of peroxytitanium (peroxytitanic acid), etc. before supporting the semiconductor photocatalyst on the particles. The pretreatment by peroxytitanium makes the particles well wettable, and the sol of the semiconductor photocatalyst is evenly spread out over the surface of the particles, this making the semiconductor photocatalyst supported uniformly over the surface of the particles. The pretreatment by peroxytitanium is likewise effective for the particles made of a metal such as an austenitic stainless steel to make the particles well wettable with the sol of the semiconductor photocatalyst. Peroxytitanium may also serve as a binder. Since peroxytitanium contains no ceramic constituent, it is well compatible with a metal. Therefore, the semiconductor photocatalyst is securely bound to the metal particles through peroxytitanium, and is not exfoliated even when the substrate is deflected or vibrated.

The semiconductor photocatalyst usable in the present invention may be $TiO_2$, ZnO, $SrTiO_3$, CdS, CdO, CaP, InP, $In_2O_3$, CaAs, $BaTiO_3$, $K_2NbO_3$, $Fe_2O_3$, $Ta_2O_5$, $WO_3$, $SnO_2$, $Bi_2O_3$, NiO, $Cu_2$ $MoS_2$, $MoS_3$, InPb, $RuO_2$ and $CeO_2$. Of these semiconductor photocatalysts, anatase-type $TiO_2$ is preferable due to low cost, good stability in properties and harmlessness to human body.

Upon illuminating a semiconductor photocatalyst with a light of a wavelength having energy higher than the band gap of the semiconductor, the electron-hole pair is created in the semiconductor. As a result thereof, hydroxyl radicals and activated oxygen are generated on the surface of the semiconductor photocatalyst. The contaminants contacting the semiconductor photocatalyst are oxidatively or reductively decomposed by the hydroxyl radicals and activated oxygen. With such a function, the semiconductor photocatalyst decomposes or removes contaminants such as foul smell, dirty oil, microorganisms such as bacteria, viruses, etc.

As described above, the surface area of the substrate is increased by the particles disposed thereon, this in turn increasing the area of the photocatalytic surface. The particle layer with a packing density decreasing with increasing distance from the substrate surface permits the activating light to penetrate into inside the particle layer thereby ensuring adequate illumination over the entire photocatalytic surface to efficiently activate the semiconductor photocatalyst. The fluid stream entering into the particle layer is disturbed by the particles to change the flow direction and remains stored in the hollow spaces between the particles, thereby to increase the opportunity of contact between the contaminants and the semiconductor photocatalyst. Thus, the first photocatalyst-supporting body of the present invention shows a high photocatalytic efficiency.

[2] Second Photocatalyst-Supporting Body

Figure 8:
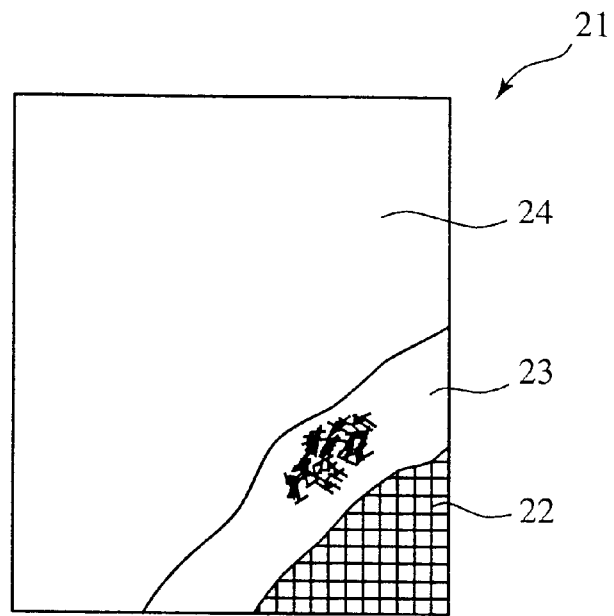
FIG. 8 is a schematic illustration, partially in broken view, showing a second photocatalyst-supporting body of the present invention.

As shown in FIG. 8, a second photocatalyst-supporting body 21 of the present invention comprises a substrate 22, a porous layer 23 being a nonwoven metal fabric fixedly disposed on at least one surface of the substrate 22, and a semiconductor photocatalyst layer 24 deposited on the surface of the porous nonwoven metal fabric 23.

The substrate 22 is a meshed member such as a wire cloth of plain weave or a punching metal, each made of an austenitic stainless steel such as SUS304, SUS310, SUS316, etc., aluminum, an aluminum alloy such as Al—Si—Mg alloy, titanium, a titanium alloy such as Ti—Mn alloy and Ti—Cr alloy, copper or a copper alloy.

The plain weave is the simplest form of wire weave in which the weft wires pass alternately over and under the warp wires. The weft wires and the warp wires are respectively configured in equal intervals. (JIS G3555). The diameter of the wire is preferably 0.1–2 mm. The wire cloth preferably has a mesh number of 2–100 per inch, and an opening of 0.5–3 mm. An open area ratio (R) calculated from the formula: $R(\%) = (a/(a+b))^2 \times 100$, wherein "a" is the opening and "b" is the diameter of wire, is preferably 30–60%. The wire cloth is preferably rolled at a rolling reduction of 2–50%. The rolling of the wire cloth ensures an easy formation of the porous layer with a uniform thickness on the surface thereof. No effect of the rolling is obtained when the rolling reduction is smaller than 2%. When the rolling reduction is larger than 50%, the mesh size is made unduly small to prevent a fluid stream from smoothly passing through the resultant photocatalyst-supporting body. The wire cloth after rolling preferably has a thickness of 0.5–3 mm. A thickness lower than 0.5 mm makes the resulting photocatalyst-supporting body poor in mechanical strength and a thickness larger than 3.0 mm detrimentally increases the permeability resistance.

The punching metal is a perforated thin metal plate, preferably 0.1–3 mm in thickness, having a number of holes to form a meshed structure. The opening of the mesh is preferably 3–20 mm ×2–10 mm. The material for the punching metal may be the same as those for the wire cloth.

The substrate 22 may be formed into a shape of plate or three-dimensional structures such as cube, rectangular solid, sphere, cylinder, honeycomb, grille, etc. or any combination thereof.

Figure 9:
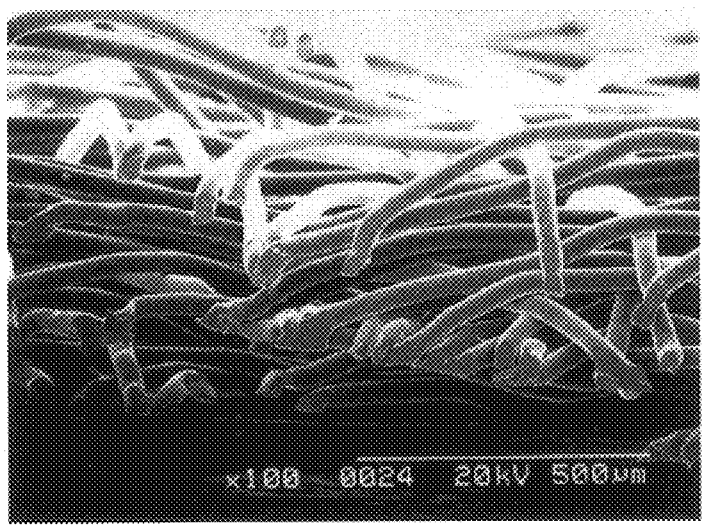
FIG. 9 is a photomicrograph showing a cross-sectional view of a nonwoven metal fabric of a second photocatalyst-supporting body of the present invention.

The porous layer 23 is a nonwoven metal fabric made of metal fibers of 10–50 μm in diameter and several mm to several tens mm in length. The nonwoven metal fabric is directly formed on at least one surface of the substrate from the metal fibers made of the same materials as those for the substrate. On the surface of the substrate, the metal fibers are scattered and sprinkles so as to have a density of about 90%, for example, the density of the substrate. The metal fibers may be rolled to increase the crossing area of fibers. Then the metal fibers are sintered to provide the nonwoven metal fabric at 1000–1150° C. for 30 minutes to 8 hours in vacuum or hydrogen atmosphere while applying a load of 5–50 g/cm². The sintered product may be rolled at a rolling reduction of 2–50% to enhance the mechanical strength. The cross-sectional view of the nonwoven metal fabric is photomicrographically shown in FIG. 9. Since the metal fibers are sintered to be securely bonded to each other at the crossing portions, the resulting nonwoven metal fabric has a tough structure. Also, since the nonwoven metal fabric is supported on the substrate, the laminate structure has a high mechanical strength.

The thickness of the nonwoven metal fabric is preferably 0.1–4 mm and the opening on the surface is preferably 10 μm or more, preferably 50–1000 μm. A thickness larger than 4 mm unfavorably increases the weight of the photocatalyst-supporting body, and a thickness smaller than 0.1 mm reduces the mechanical strength. The bonding structure of metal fibers are practically the same on the surface and the cross sectional area.

The semiconductor photocatalyst 24 is deposited on the porous layer 23 in the same manner as described above.

In a modification of the second embodiment, a layer of the nonwoven metal fabric may be disposed between two layers of the substrate of meshed structure, preferably the punching metal. The nonwoven metal fabric layer, which may be of a laminated structure of two or more sheets of the nonwoven metal fabric, is securely fixed to the substrate layers by rolling with or without a subsequent sintering. Then, the semiconductor photocatalyst is deposited on the porous non woven metal fabric and the substrates as described above. The photocatalyst-supporting body thus constructed exhibits a good sound deadening effect and particularly suitable as a sound barrier, etc.

As described above, in the second photocatalyst-supporting body, the area of the photocatalytic surface is increased by the porous structure of the porous layer 23. The porous structure permits the activating light to penetrate into inside the porous layer thereby ensuring adequate illumination over the entire photocatalytic surface to efficiently activate the semiconductor photocatalyst. The fluid stream entered into the porous layer is disturbed by the bonded metal fibers to change the flow direction and stays temporarily in the hollow spaces between the sintered metal fibers, thereby to increase the contact of the contaminants with the semiconductor photocatalyst. Thus, the second photocatalyst-supporting body of the present invention shows a high photocatalytic efficiency.

[3] Third Photocatalyst-Supporting Body

Figure 12:
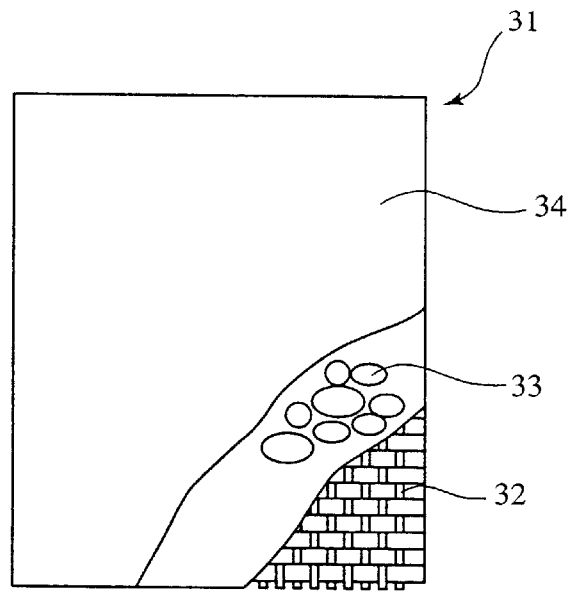
FIG. 12 is a schematic illustration, partially in broken view, showing a third photocatalyst-supporting body of the present invention.
Figure 13:
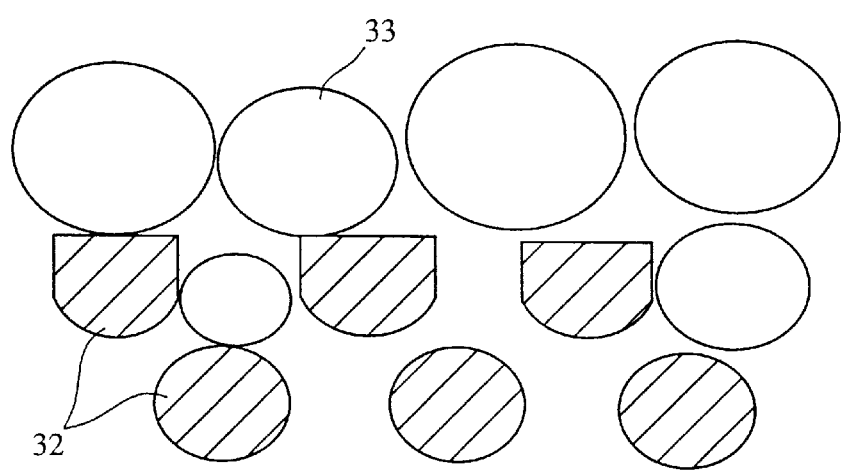
FIG. 13 is a cross-sectional view showing a third photocatalyst-supporting body of the present invention.

As shown in FIG. 12, a third photocatalyst-supporting body 31 of the present invention comprises a substrate 32, a porous layer 33 made of fine metal particles securely disposed on at least one surface of the substrate 32, and a semiconductor photocatalyst layer 34 deposited on the porous layer 33. The cross-sectional view of the third photocatalyst-supporting body is shown in FIG. 13.

The substrate 32 is a meshed member such as a wire cloth or the punching metal mentioned above, each made of an austenitic stainless steel such as SUS304, SUS310, SUS316, etc., aluminum, an aluminum alloy such as Al—Si—Mg alloy, titanium, a titanium alloy such as Ti—Mn alloy and Ti—Cr alloy, copper or a copper alloy. Since the wire cloth supports fine metal particles thereon in this embodiment, the mesh size of the wire cloth is preferred to be small in some extent. Therefore, the wire cloth is preferably of plain Dutch weave (JIS G3555DW) in which the weft wires pass alternately over and under the warp wires thicker than the weft wires and the weft wires are arranged so as to contact each other, twilled Dutch weave (JIS G3555) in which the weft wires float over groups of two warp wires thicker than the weft wires and the weft wires are arranged so as to contact each other, or stranded twilled weave (JIS G3555) in which the stranded warp of about five wires and the stranded weft of about seven wires are woven in the form of twilled weave. The wire cloth is preferably rolled at a rolling reduction of 2–50% to ensure the formation of the porous layer with a uniform thickness on the surface thereof. No effect of the rolling is obtained when the rolling reduction is smaller than 2%. When the rolling reduction is larger than 50%, the mesh size is made unduly small to prevent a fluid stream from smoothly passing through the resultant photocatalyst-supporting body. The wire cloth after rolling preferably has a thickness of 0.2–0.4 mm and a mesh number of 50–400 per inch. A thickness lower than 0.2 mm makes the resulting photocatalyst-supporting body poor in mechanical strength and a thickness larger than 0.4 mm detrimentally increases the permeability resistance.

The substrate 32 may be formed into a shape of plate or three-dimensional structure such as cube, rectangular solid, sphere, cylinder, honeycomb, grille, etc. or any combination thereof.

On the substrate 32, the porous layer 33 of fine meal particles is disposed to increase the area of the photocatalytic surface.

The material for the fine metal particles may be an austenitic stainless steel such as SUS304, SUS310, SUS316, etc., aluminum, an aluminum alloy such as Al—Si—Mg alloy, titanium, a titanium alloy such as Ti—Mn alloy and Ti—Cr alloy, copper or a copper alloy. Of these materials, titanium, titanium alloy, aluminum and aluminum alloy are preferable. Since metal particles having an extremely small size are expensive and metal particles having an extremely large size fail to provide fine pores, the average particle size of the metal particles is preferably 10–400 $\mu$m, and more preferably 200–400 $\mu$m. The shape of the metal particles is not strictly limited, and the metal particles may be in the shape of sphere, granule, flake, leaf, thin plate and irregular shape with sharp edges as in angular particles. The metal particles of irregular shape are preferable in view of increasing the area of photocatalytic surface because deep pores are produced on the surface of the porous layer. When the particles are fused to the substrate by sintering, baking, etc., the particles and the substrate are preferably made of the same material in view of their compatibility. When made of different materials, it is preferred to use a suitable binder to securely bind the particles to the substrate. In this case, it is preferred that the different materials have coefficients of linear expansion equal to or nearly equal to each other, or one of the materials has stretching properties comparable to the linear expansion of the other. The binder may be selected from an inorganic glass, a frit, a powder of metal, a thermosetting resin, etc.

The porous layer 33 is formed by coating on the surface of the substrate 32 a slurry or dispersion (solid content: 60–80 weight %) of the fine metal particles in a liquid medium such as water, drying the coating, and then sintering or baking the dried product to securely bind the metal particles to the substrate surface and securely bind the metal particles to each other. The coating method may include spray-coating, dip-coating, screen-printing, etc. Also, the metal particles may be coated densely in the vicinity of the substrate surface and roughly with increasing distance from the substrate surface or may be coated on the substrate roughly in the vicinity of the substrate surface and densely with increasing distance from the substrate surface to provide a particle layer with the packing density gradient as described above with respect to the first photocatalyst-supporting body. Further, the metal particles may be coated so as to form the structure having a plurality of conical projections, pyramidal projections, frustum projections or ribs as described above.

The sintering temperature depends on the material of the metal particles. A sufficient sintering density is not obtained to reduce the mechanical strength when the sintering temperature is too low and coarse pores are formed due to melting of the metal particles when it is as high as the melting point of the metal. For example, the sintering temperature is preferably 800–1000° C. for stainless steel, titanium, copper and their alloys, and 300–400° C. for aluminum and its alloy.

The pore size of the porous layer is preferably 5–1000 $\mu$m, and more preferably 50–100 $\mu$m. If it is intended to purify a fluid stream by filtering out the small solid impurities therein, the pore size is preferred to be 100 $\mu$m or less. The thickness of the porous layer is preferably 10–100 $\mu$m. When smaller than 10 $\mu$m, the mechanical strength is insufficient. The permeability resistance is unfavorably increased when exceeding 100 $\mu$m.

The semiconductor photocatalyst 34 is deposited on the porous layer 33 in the same manner as described above.

As described above, in the third photocatalyst-supporting body, the area of the photocatalytic surface is increased by the porous structure of the porous layer 33. The porous structure permits the activating light to penetrate into inside the porous layer thereby ensuring adequate illumination over the entire photocatalytic surface to efficiently activate the semiconductor photocatalyst. The fluid stream entering into the porous layer is disturbed by the metal particles to change the flow direction and stays temporarily in the hollow spaces between the sintered metal particles, thereby to increase the contact of the contaminants with the semiconductor photocatalyst. Thus, the third photocatalyst-supporting body of the present invention shows a high photocatalytic efficiency.

[4] Fourth Photocatalyst-Supporting Body

Figure 14:
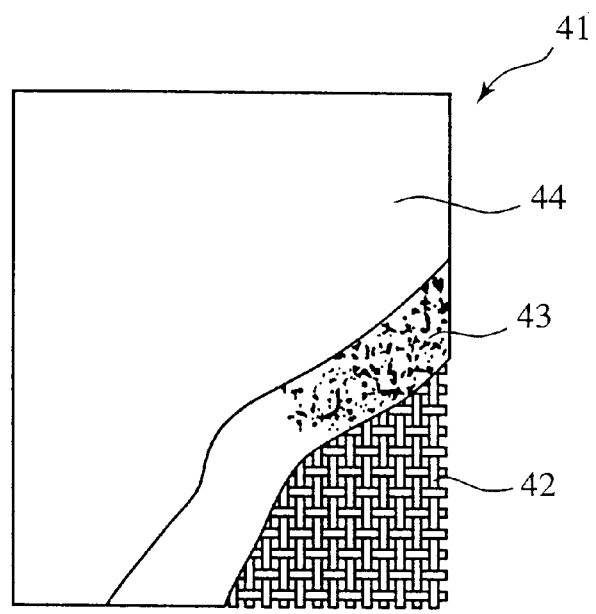
FIG. 14 is a schematic illustration, partially in broken view, showing a fourth photocatalyst-supporting body of the present invention.

As shown in FIG. 14, a fourth photocatalyst-supporting body 41 of the present invention comprises a substrate 42, a porous layer 43 made of fine metal particles securely disposed on at least one surface of the substrate 42, and a semiconductor photocatalyst layer 44 deposited on the porous layer 43.

The substrate 42 is practically the same as the meshed member and the punching metal as described with respect to the second photocatalyst-supporting body.

Figure 15:
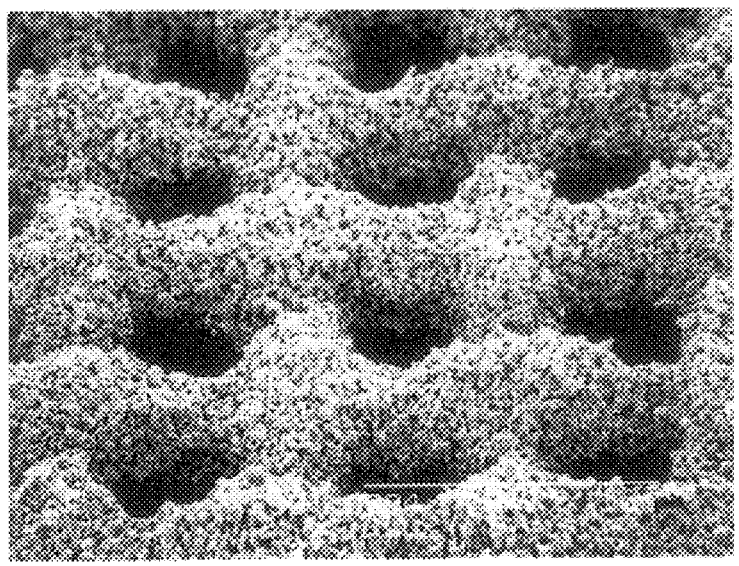
FIG. 15 is a photomicrograph showing a substrate (wire cloth) coated with a porous layer in the fourth photocatalyst-supporting body of the present invention.

On the substrate 42, the porous layer 43 of fine metal particles is disposed to increase the area of the photocatalytic surface. The substrate (wire cloth) coated with the porous layer is photomicrographically shown in FIG. 15.

The material for the fine metal particles may be an austenitic stainless steel such as SUS5304, SUS310, SUS316, etc., aluminum, an aluminum alloy such as Al—Si—Mg alloy, titanium, a titanium alloy such as Ti—Mn alloy and Ti—Cr alloy, copper or a copper alloy. Since metal particles having an extremely small size are expensive and metal particles having an extremely large size fail to provide fine pores, the average particle size of the metal particles is preferably 10–400 $\mu$m. The shape of the metal particles is not specifically limited, and metal particles may be in the shape of sphere, granule, flake, leaf, thin plate and irregular shape with sharp edge as in angular particles. The metal particles of irregular shape are preferable in view of increasing the area of photocatalytic surface because deep pores are produced on the surface of the porous layer. When the metal particles are fused to the substrate by sintering, baking, etc., the metal particles and the substrate are preferably made of the same material in view of their compatibility. When made of different materials, it is preferred to use a suitable binder to securely bind the metal particles to the substrate. In this case, it is preferred that the different materials have coefficients of linear expansion equal to or nearly equal to each other, or one of the materials has stretching properties comparable to the linear expansion of the other. The binder may be selected from an inorganic glass, a frit, a powder of metal, a thermosetting resin, etc.

The porous layer 43 is formed by coating on the surface of 10 the substrate 42 a slurry or dispersion (solid content: 60–80 weight %) of the fine metal particles in a liquid medium such as water, drying the coating, and then sintering or baking the dried product to securely bind the metal particles to the substrate surface and securely bind the metal particles to each other. The coating method may include spray-coating, dip-coating, screen-printing, etc. Also, the metal particles may be coated densely in the vicinity of the substrate surface and roughly with increasing distance from the substrate surface or may be coated on the substrate roughly in the vicinity of the substrate surface and densely with increasing distance from the substrate surface to provide a particle layer with the packing density gradient as described above with respect to the first photocatalyst-supporting body. Further, the metal particles may be coated so as to form the structure having a plurality of conical projections, pyramidal projections, frustum projections or ribs as described above.

The sintering temperature depends on the material of the metal particles. A sufficient sintering density is not obtained to reduce the mechanical strength when the sintering temperature is too low and coarse pores are formed due to melting of the metal particles when it is as high as the melting point of the metal. For example, the sintering temperature is preferably 800–1000° C. for stainless steel, titanium or copper particles and 300–400° C. for aluminum particles.

The pore size of the porous layer is preferably 5–1000 $\mu$m. If it is intended to purify a fluid stream by filtering out the small solid impurities therein, the pore size is preferred to be 1000 $\mu$m or less. The thickness of the porous layer is preferably 10–100 $\mu$m. When smaller than 10 $\mu$m, the mechanical strength is insufficient. The permeability resistance is unfavorably increased when exceeding 100 $\mu$m.

The semiconductor photocatalyst 44 is deposited on the porous layer 43 in the same manner as described above.

As described above, in the fourth photocatalyst-supporting body, the area of the photocatalytic surface is increased by the porous structure of the porous layer 43. The porous structure permits the activating light to penetrate into inside the porous layer thereby ensuring adequate illumination over the entire photocatalytic surface to efficiently activate the semiconductor photocatalyst. The fluid stream entering into the porous layer is disturbed by the metal particles to change the flow direction and remains stored in the hollow spaces between the sintered metal particles, thereby to increase the contact of the contaminants with the semiconductor photocatalyst. Thus, the fourth photocatalyst-supporting body of the present invention shows a high photocatalytic efficiency.

The first to fourth photocatalyst-supporting bodies described above may be used in several manners and shapes. A photocatalyst-supporting body may be used in the shape of flat plate or sheet. One or more photocatalyst-supporting bodies of plate or sheet form may be formed into three-dimensional structures such as cube, rectangular solid, sphere, cylinder, honeycomb, grille, etc. A honeycomb-structured photocatalyst-supporting body is particularly useful for cleaning exhaust gas from a gasoline engine, etc.

In place of forming one or more photocatalyst-supporting bodies of plate or sheet form into a three-dimensional structure, a substrate with or without the porous metal particle layer may be directly formed into the three-dimensional structure by a press working, etc. The photocatalyst is deposited after the shaping. Therefore, this method of production is useful to avoid the dislodgment of the photocatalyst from the photocatalyst-supporting body during the shaping.

Figure 16A:
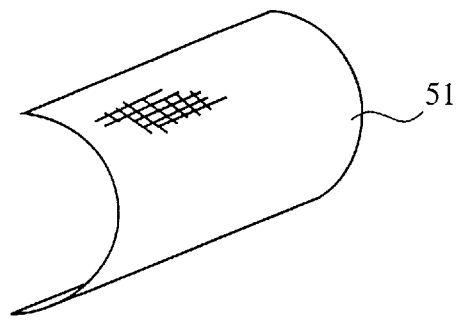
FIGS. 16(a) to 16(c) are schematic illustrations showing three-dimensional structures of the photocatalyst-supporting body.
Figure 16B:
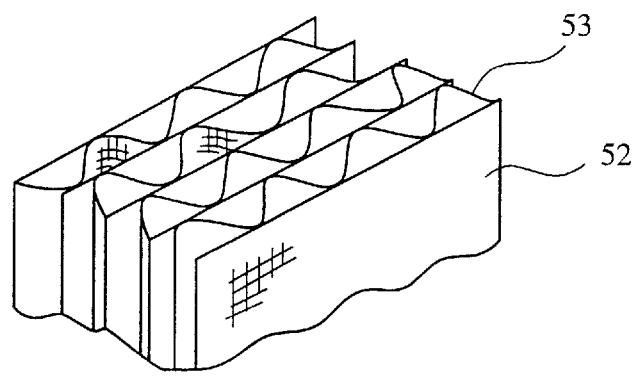
Figure 16C:
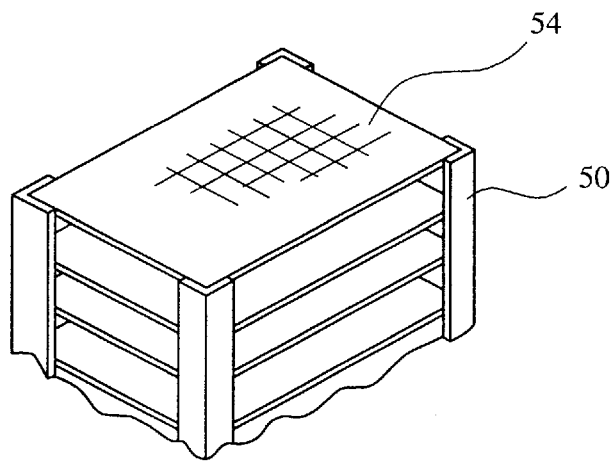

Examples for the three-dimensional structures are illustrated in FIGS. 16(a) to 16(c). In FIG. 16(a), a sheet of photocatalyst-supporting body 51 is formed into semicylindrical shape. FIG. 16(b) shows a honeycomb structure in which photocatalyst-supporting bodies 52 of sheet form and corrugated photocatalyst-supporting body 53 are alternately arranged. In FIG. 16(c), a plurality of photocatalyst-supporting bodies 54 of sheet form are stacked one on top of the other with a given spaced interval in a frame structure 50.

Figure 17:
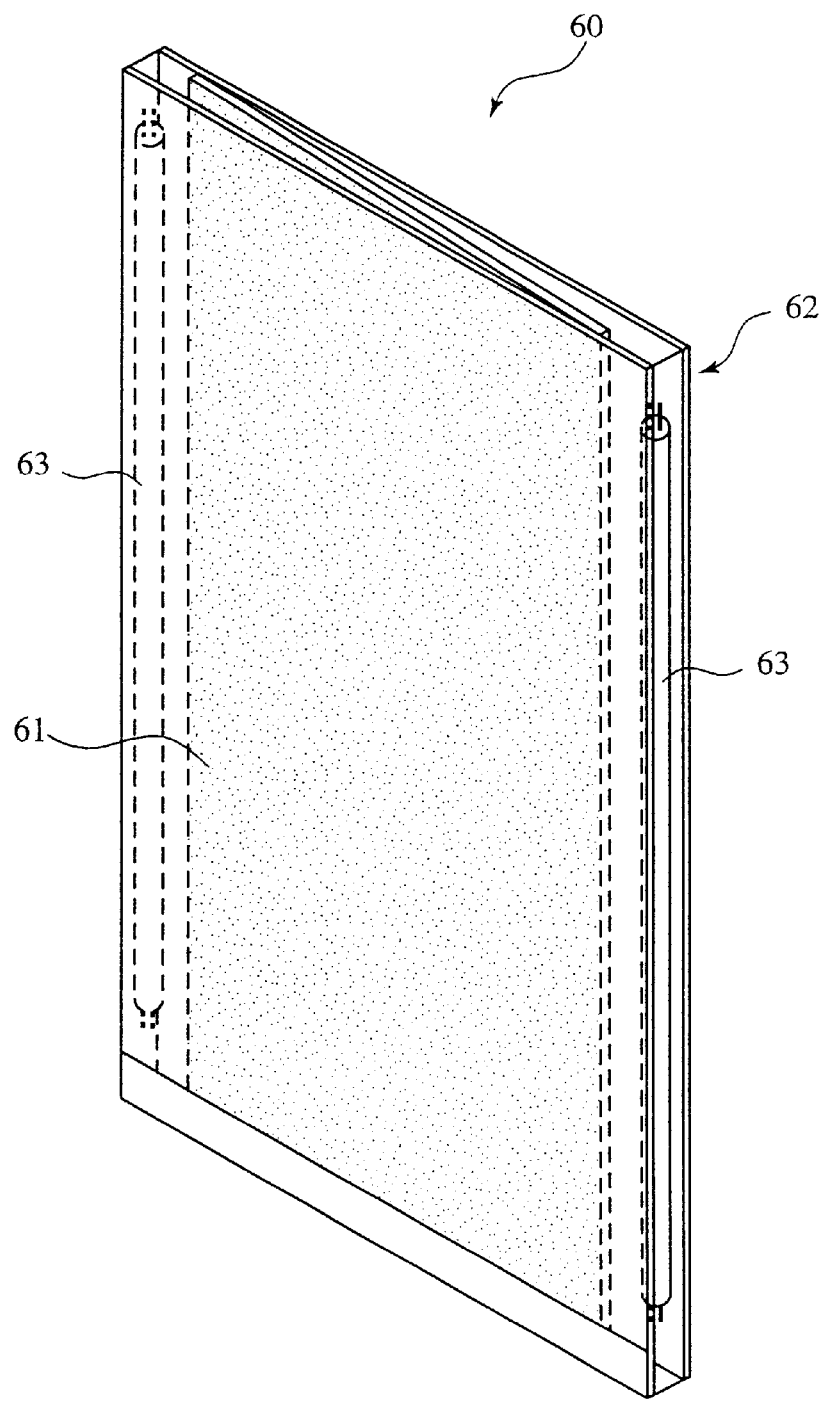
FIG. 17 is a schematic perspective view showing a photocatalytic apparatus of the present invention.

FIG. 17 is a schematic illustration of a preferred embodiment of the photocatalytic apparatus using any of the first to fourth photocatalyst-supporting bodies described above. A photocatalytic apparatus 60 basically comprises a photocatalyst-supporting body 61 of sheet form, a pair of light sources 63, 63, and a rectangular frame 62. The photocatalyst-supporting body 61 is placed in the frame 62 so that the upper and lower opposite sides of the photocatalyst-supporting body 61 diagonally extend with respect to the top and bottom surfaces of the frame 62. A pair of light sources 63, 63 are also disposed in the frame 62 respectively along the opposite vertical sides of the photocatalyst-supporting body 61. With such a construction, the photocatalytic apparatus 61 can be made thinner. Also, since the light sources 63, 63 are positioned on the side of the photocatalyst-supporting body 61, the fluid stream in perpendicular to the surface of the body 61 is not disturbed by the light sources. The photocatalytic apparatus 60 is particularly suitable in the case in which the light source cannot be positioned in front of the photocatalyst-supporting body for structural and geometric reasons.

In the photocatalytic apparatus 61, the front surface of the photocatalyst-supporting body 61 is illuminated by the activating light from one of the light sources 63, 63, and the back surface is illuminated by the activating light from the other. The activating light irradiated on the photocatalytic surface is reflected and scattered by the surface roughness to reach the substantial areas of the photocatalytic surface, thereby to minimize shadowing on the surfaces of the photocatalyst-supporting body 61. This enhances the photocatalytic efficiency.

When the substrate is porous as in the meshed member, the photocatalyst-supporting body also serves as a filter or a partition for cleaning indoor air. For example, when a part of inner wall of a closed chamber such a refrigerator, etc. is formed from a photocatalyst-supporting body and the internal air is circulated through the body, harmful substances such as ethylene aging fresh vegetables and fruits and offensive smell due to hydrogen sulfide, mercaptan, etc. can be removed from the internal air. Since the inner wall serves as a filter, no additional filter is needed thereby making the internal space of the chamber large and making the construction simple.

Figure 18:
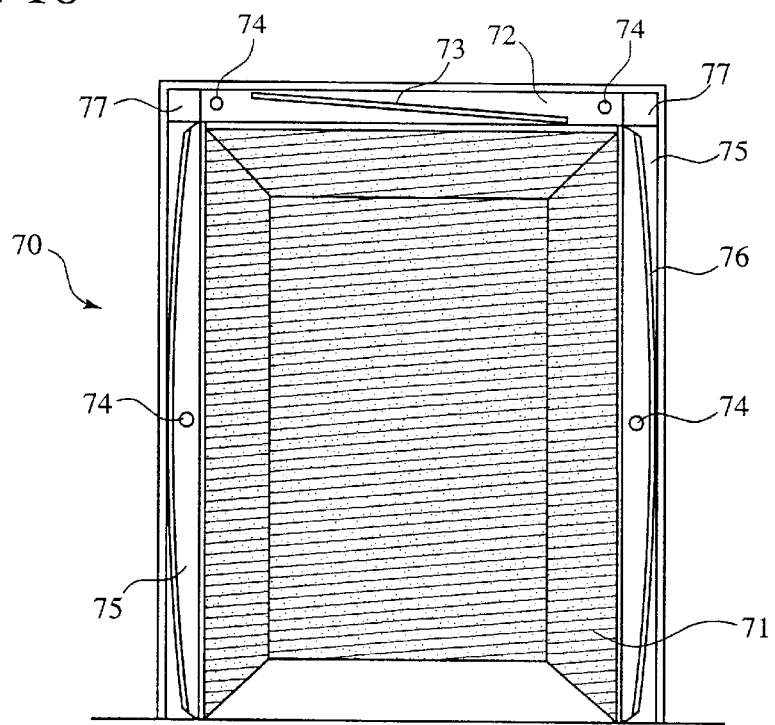
FIG. 18 is a schematic illustration showing a storehouse utilizing the photocatalyst-supporting body of the present invention.

FIG. 18 is a schematic illustration of a storehouse 70 for storing fresh vegetables, etc. The inner walls of the storehouse 70 are lined with the photocatalyst-supporting bodies 71 of plate form with a space 72 or 75 between the wall and the body. A reflection member 73 is diagonally disposed in the upper space 72 with a pair of light sources 74, 74 on both sides thereof.

Figure 19A:
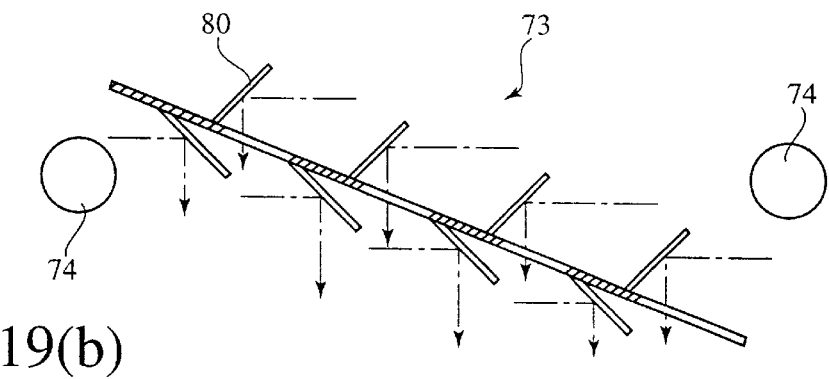
FIGS. 19(a) and 19(b) are enlarged views showing the reflection members of FIG. 18.
Figure 19B:
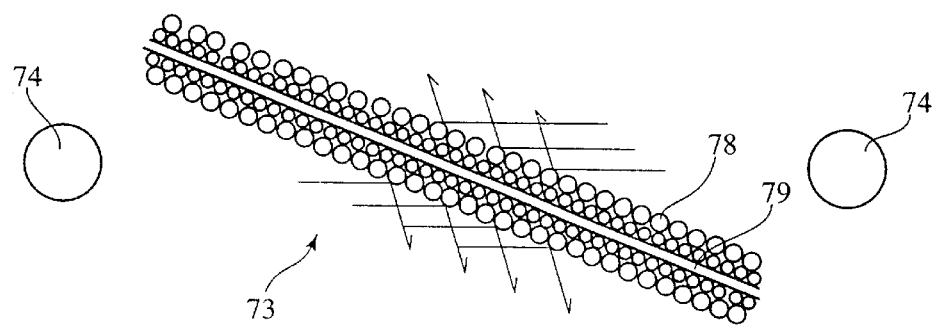

As shown in FIG. 19(a), the reflection member 73 has a plurality of reflection pieces 80 on both surfaces, the reflection pieces 80 extending apart from the reflection member 73 at predetermined angles so as to reflect the activating lights from the light sources 74, 74 into the direction of the photocatalyst-supporting body 71 below the reflection member 73. This type of the reflection member is useful to reflect the activating lights from multiple light sources into the same direction. Another type of the reflection member is shown in FIG. 19(b), which has reflection layers 78 on both surfaces of a plate 79 made of stainless steel, etc. The reflection layer 78 is formed by coating metal particles made of stainless steel etc. on both surfaces of the plate 79. The coating is made densely with fine metal particles on the surface of the plate 79, and roughly with coarse metal particles on the dense layer. The coated metal particles are securely bound to the plate 79 by sintering. This type of the reflection member is useful to reflect the activating light in the opposite directions.

In each of the side spaces 75, 75, a reflection plate 76 having an ellipsoidal reflective surface is disposed with a light source 74 at the center thereof. The spaces 72, 75, 75 are communicated with ceiling ducts 77, 77. The air in the storehouse 70 is circulated by a circulating pump (not shown) through the photocatalyst-supporting body 71, and the aging substances such as ethylene and offensive smell are decomposed by photocatalyzed oxidation and reduction.

Figure 20:
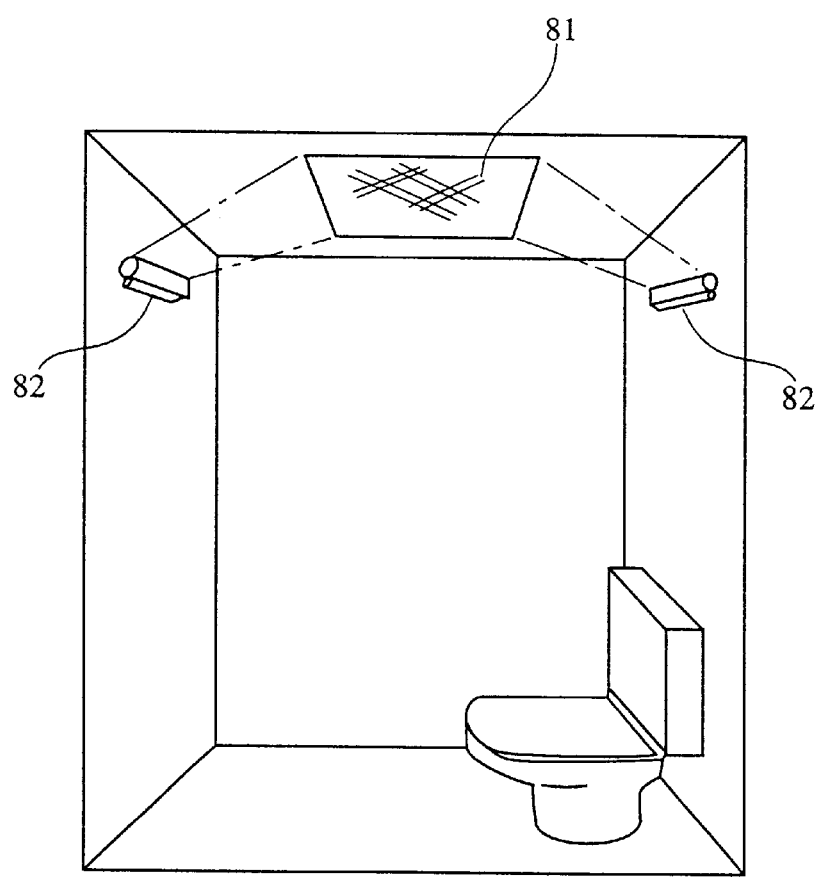
FIG. 20 is a schematic illustration showing the deodorization of a toilet room using the photocatalyst-supporting body of the present invention.

FIG. 20 is a schematic illustration showing a deodorizing method of a toilet room. A photocatalyst-supporting body 81 of plate form is attached to the ceiling of the toilet room with a predetermined space therebetween. The photocatalytic surface is activated by light from light sources 82, 82. The internal air of the toilet room is circulated by a ventilating system through the photocatalyst-supporting body 81 thereby to bring the offensively smelling substances into contact with the photocatalytic surface. Since the photocatalytic surface is formed on the porous structure with pores and roughness, the offensively smelling substances are efficiently decomposed during contacting or passing through the pores to enhance the photocatalyzed deodorization.

In addition to the cleaning effect, the photocatalyst-supporting body exhibits a sound deadening effect, a shielding effect, a defoaming effect and a wave motion deadening effect according to the application.

When the photocatalyst-supporting body is uses as a sound barrier between a sidewalk and a roadway, the sound deadening effect is obtained in addition to photocatalyzed decomposition of NOx and SOx. The traffic noise is reduced because the propagation energy of sound wave is absorbed by the photocatalyst-supporting body during penetrating into and passing through the complicated porous structure. The effect is enhanced when the porous particle layer is of a structure which is dense in the vicinity of the substrate surface and becomes rough with increasing distance from the surface.

The shielding effect is obtained when the photocatalyst-supporting body is used as a blind. The wave motion of a liquid stream make the opportunity of the contaminants to contact the photocatalytic surface uneven. However, the liquid stream penetrating into the photocatalyst-supporting body stays temporarily in the porous structure to provide an uniform opportunity of contact.

The foams in a liquid stream cover the photocatalytic surface and prevent adequate contact between the contaminants and the photocatalytic surface. As the liquid stream penetrates into the photocatalyst-supporting body, the foams are divided into fine foams due to the complicated porous structure to prevent the photocatalytic surface from being covered with the foams.

The photocatalyst-supporting body of the present invention may be used as a filter for solid-liquid separation to filter out the fine solid particles in the liquid stream. In this case, the porous particle layer is preferred to have a structure which is rough in the vicinity of the substrate surface and becomes dense with increasing distance from the substrate surface because the clogged filter is easily regenerated by reverse flow of the liquid. Also, in case of purifying a liquid stream, a flat shape of the photocatalyst-supporting body may be vibrated by a suitable means to increase the opportunity of the contaminants to contact the photocatalytic surface.

In addition, the photocatalyst-supporting body of the present invention may be used as a filter in air-conditioning system, a building component such as wallboard, a wall material for alga-free aquarium and swimming pool, etc.

The present invention will be further described while referring to the following Examples which should be considered to illustrate various preferred embodiments of the present invention.

EXAMPLE 1

A substrate of 280 $\mu$m in thickness was prepared by rolling at a rolling reduction of 30% a wire cloth of plain Dutch weave (#40/200 mesh) made of an austenitic stainless steel SUS316. An aqueous dispersion of a powder of SUS316L having an average particle size of 10 $\mu$m was coated on both surfaces of the substrate in a thickness of 60 $\mu$m, and then sintered at 950° C. for 10 hours to form a first particle layer. Then an aqueous dispersion of a powder of SUS316L having an average particle size of 12 $\mu$m was coated on the first particle layer in a thickness of 60 $\mu$m, rolled at a rolling reduction of 15%, and then sintered at 730° C. for 10 hours in hydrogen atmosphere to form a second particle layer. The sintering was carried out using water as a binder. The substrate disposed with the particle layers had a total thickness of 0.34 mm.

A 3:7:0.1 mixture (by weight) of a hydrosol of amorphous peroxytitanium (solid content: 0.84 weight %), a hydrosol of anatase titanium oxide (Technology of Art & Original Colors, Inc., TO Sol®; solid content: 0.84 weight %) and a colloidal silica solution (solid content: 0.84 weight %) was spray-coated on the surface of each particle layer in a coating amount of 0.1 g/25 cm$^2$ (wet basis). After drying at ordinary temperature, the spray-coated product was baked at 300° C. for one hour to obtain a photocatalyst-supporting body of the present invention.

The cross-sectional view of the photocatalyst-supporting body 1 thus produced is schematically shown in FIG. 1, while omitting the semiconductor photocatalyst supported on the particles 3, 3'. On both surfaces of the rolled substrate 2 (wire cloth of plain Dutch weave), the SUS316L particles 3 having an average particle size of 12 $\mu$m were densely packed to form the first particle layers 4, 4, on which the porous second particle layers 5, 5 were formed by roughly packing the SUS316L particles 3' having an average particle size of 10 $\mu$m.

Figure 3:
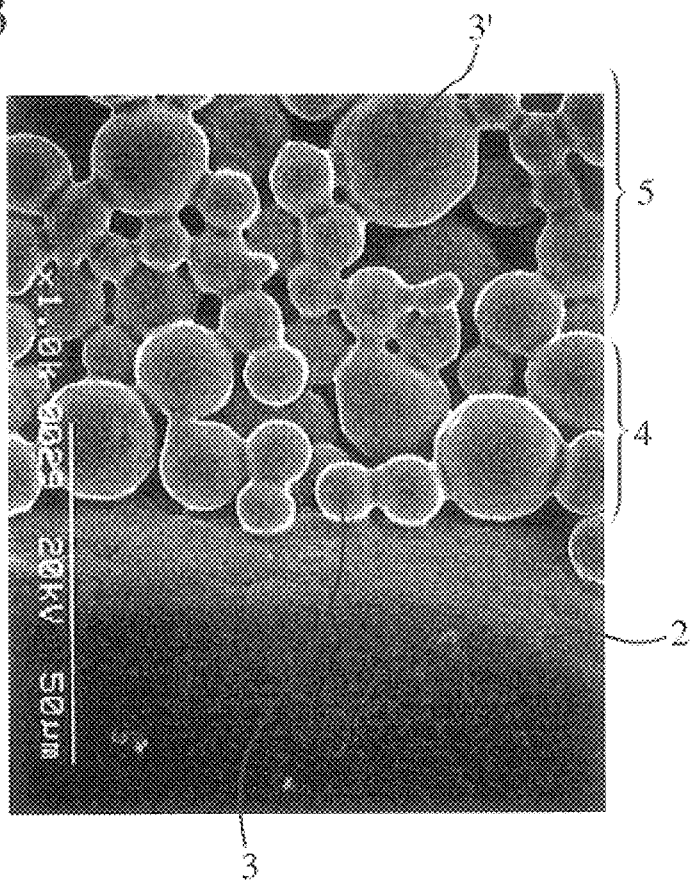
FIG. 3 is a photomicrograph showing the bonding between the particles and between the particles and the substrate.
Figure 4:
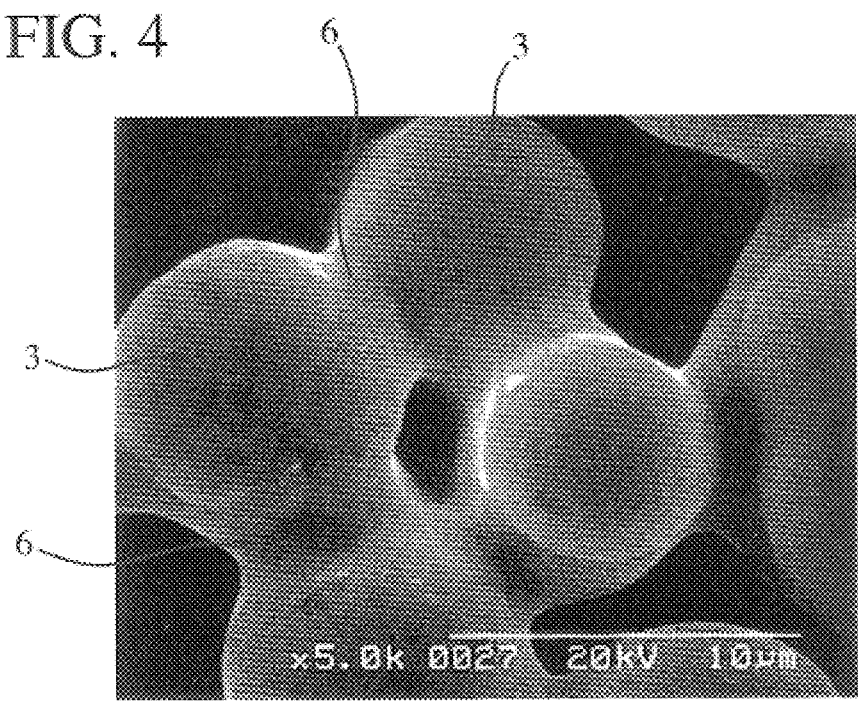
FIG. 4 is a photomicrograph showing the bonding between the particles.

FIG. 3 is a photomicrograph (×800) showing a cross-sectional view of the substrate 2 having the first particle layer 4 and the second particle layer 5. A dense layer is formed in the vicinity of the substrate surface, and a rough layer is formed on the dense layer to constitute the gradient structure of the packing density. FIG. 4 is a photomicrograph (×5000) showing the boding between SUS316L particles 3 through the bridging bond 6 formed by the partial melting of the particles.

EXAMPLE 2

A substrate of 280 $\mu$m in thickness was prepared by rolling at a rolling reduction of 30% a wire cloth of plain Dutch weave (#40/200 mesh) made of SUS316. An aqueous dispersion of a powder of SUS316L having an average particle size of 30 $\mu$m was coated on both surfaces of the substrate in a thickness of 100 $\mu$m, and then sintered at 960° C. for 2 hours in a vacuum furnace to form a first particle layer having an average pore size of 30 $\mu$m.

After cooling down the sintered product to room temperature, a first mask screen having a plurality of minute holes was put on the first particle layer. The same aqueous dispersion of a powder of SUS316L was screen-printed on the first particle layer through the mask screen. After removing the first mask screen, the coated product was dried at ordinary temperature. Then after putting thereon a second mask screen having a plurality of minute holes which were concentric with and smaller in diameter than those of the first mask screen, the same screen printing was repeated. Finally, after the drying at ordinary temperature, the same screen printing was further repeated by using a third mask screen having a plurality of minute holes which were concentric with and smaller in diameter than those of the second mask screen. After dried at ordinary temperature, the screen-printed product was sintered at 960° C. for 2 hours in a vacuum furnace to form a particle layer on both surfaces of the substrate.

A 3:3:0.1:0.3 mixture (by weight) of a hydrosol of amorphous peroxytitanium (solid content: 0.84 weight %), a hydrosol of anatase titanium oxide (Technology of Art & Original Colors, Inc., TO Sol®; solid content: 0.84 weight %), a colloidal silica solution (solid content: 0.84 weight %) and a coconut shell activated carbon was spray-coated on the particle layer in a coating amount of 0.6 g/25 $cm^2$ m(wet basis). After dried at ordinary temperature, the spray-coated product was baked at 300° C. for one hour to obtain a photocatalyst-supporting body of the present invention.

Figure 2:
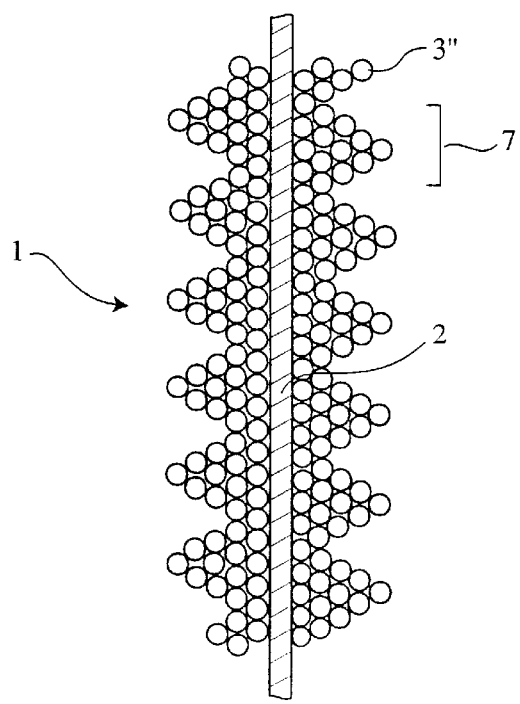
FIG. 2 is a schematic illustration showing a cross-sectional view of another first photocatalyst-supporting body of the present invention.

The cross-sectional view of the photocatalyst-supporting body 1 thus produced is schematically shown in FIG. 2, while omitting the semiconductor photocatalyst and the activated carbon supported on the particles 3". On both surfaces of the substrate 2 (rolled wire cloth of plain Dutch weave), a plurality of conical or pyramidal projections 7 are formed by the particles 3", each projection having a decreasing cross-sectional area with increasing distance from the substrate surface. Such a lamination structure of the particles 3" corresponds to the gradient packing density structure of Example 1.

Figure 5:
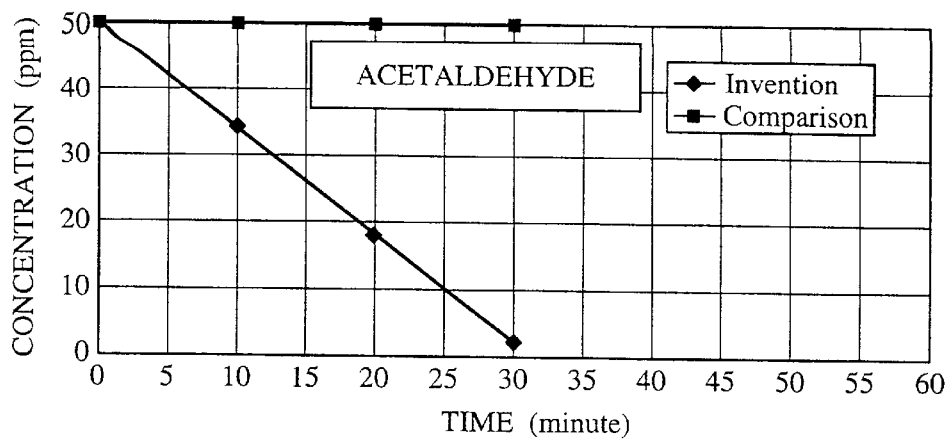
FIG. 5 is a graph showing the photocatalyzed decomposition of acetaldehyde by the photocatalyst-supporting body of Example 2.
Figure 6:
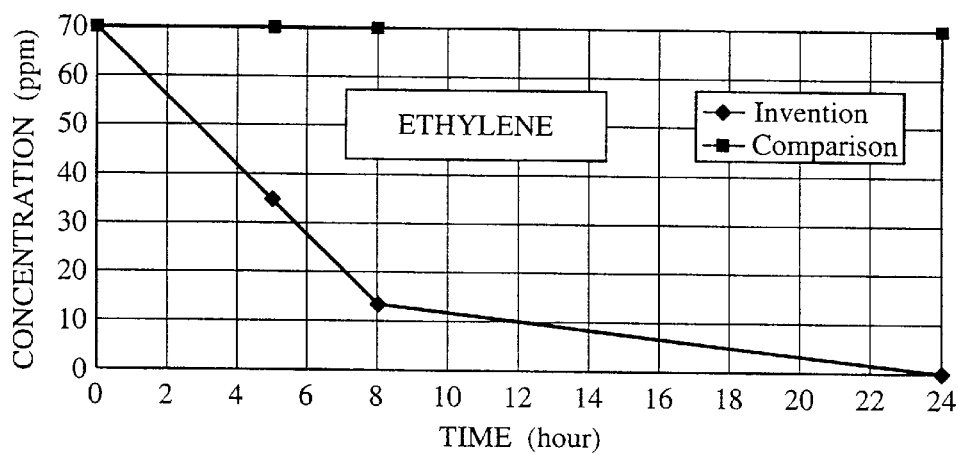
FIG. 6 is a graph showing the photocatalyzed decomposition of ethylene by the photocatalyst-supporting body of Example 2.
Figure 7:
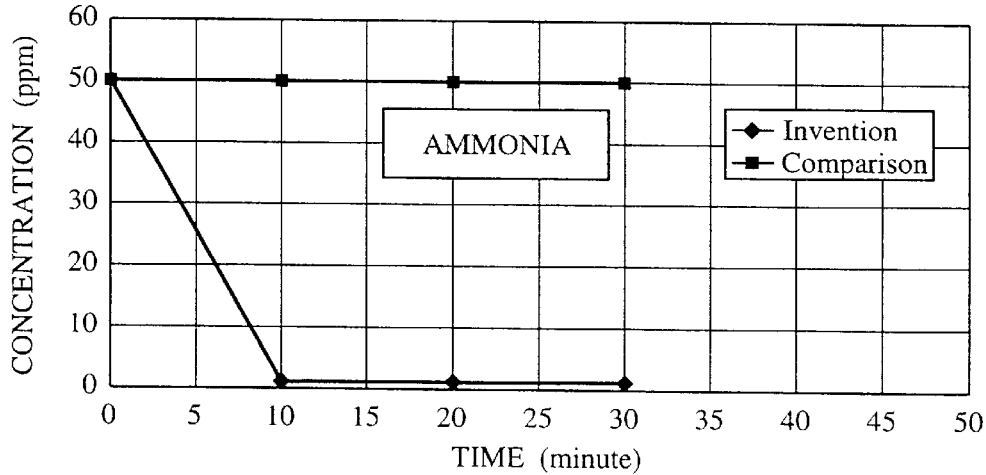
FIG. 7 is a graph showing the photocatalyzed decomposition of ammonia by the photocatalyst-supporting body of Example 2.

The photocatalyst-supporting body produced above was cut into a size of 110 mm×160 mm and then placed into a transparent resin bag (content: 5 liters). After a test gas (air containing 50 ppm ammonia gas, air containing 50 ppm acetaldehyde gas or air containing 70 ppm ethylene gas) was introduced into the resin bag, the photocatalyst-supporting body was illuminated by a black light from a light source (FL20S-SL-B, 20 W) disposed at 150 mm apart from the photocatalyst-supporting body. The concentration of each contaminant was measured in predetermined time intervals. The same tests were repeated using the substrate having the particle layer with no semiconductor photocatalyst supported thereon. The results are shown in FIGS. 5–7, from which it was confirmed that ammonia and acetaldehyde disappeared within about 10 minutes of the illumination of light, and about 90% of ethylene was decomposed after 480 minutes of the illumination.

EXAMPLE 3

Figure 10:
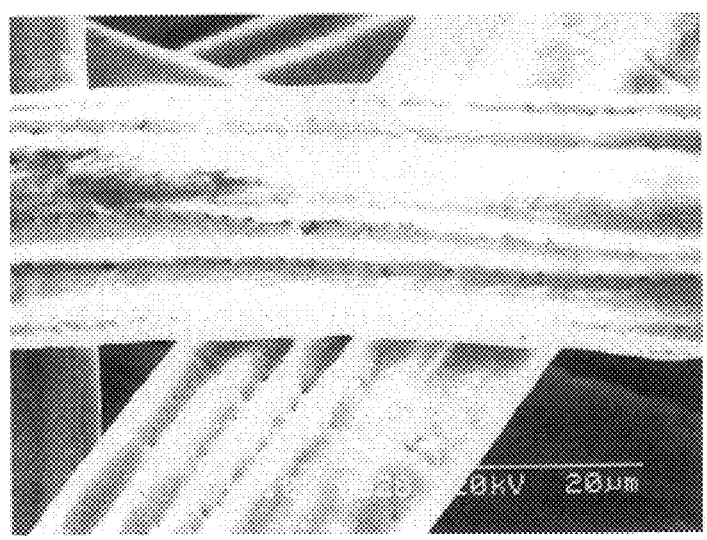
FIG. 10 is a photomicrograph showing the metal fibers before sintering.
Figure 11:
FIG. 11 is a photomicrograph showing the metal fibers after sintering in a rolled nonwoven metal fabric.

On the surface of a wire cloth of plain weave made of SUS316, metal fibers (diameter: 20 μm, length: 5 mm) made of SUS316 were sprinkled, and then sintered at 1100° C. for 5 hours under pressing at 30 g/$cm^2$. The sintered product was rolled at a rolling reduction of 50% to form a nonwoven metal fabric on the substrate. The rolled product (total thickness: 0.2 μm) had an average opening of 70 μm on the surface. The metal fibers before sintering are photomicrographically shown in FIG. 10, and the metal fibers after sintering and subsequent rolling are shown in FIG. 11. From FIG. 11, it can be seen that the metal fibers are securely bonded to each other at the crossing portions by the sintering.

A 3:7:0.1 mixture (by weight) of a hydrosol of amorphous peroxytitanium (solid content: 0.84 weight %), a hydrosol of anatase titanium oxide (Technology of Art & Original Colors, Inc., TO Sol®, solid content: 0.84 weight %) and a colloidal silica solution (solid content: 0.84 weight %) was spray-coated on the surface of the nonwoven metal fabric in a coating amount of 0.7 g/25 $cm^2$ (wet basis). After dried at ordinary temperature, the spray-coated product was baked at 300° C. for one hour to obtain a photocatalyst-supporting body of the present invention.

EXAMPLE 4

The same procedures of Example 3 were repeated except for spray-coating on the nonwoven metal fabric a 3:3:0.1:0.3 mixture (by weight) of a hydrosol of amorphous peroxytitanium (solid content: 0.84 weight %), a hydrosol of anatase titanium oxide (Technology of Art & Original Colors, Inc., TO Sol®; solid content: 0.84 weight %), a colloidal silica solution (solid content: 0.84 weight %) and a coconut shell activated carbon was spray-coated on the particle layer in a coating amount of 0.6 g/25 $cm^2$ (wet basis). After dried at ordinary temperature, the spray-coated product was baked at 300° C. for one hour to obtain a photocatalyst-supporting body of the present invention.

EXAMPLE 5

Each of the photocatalyst-supporting bodies with a size of 110 mm×160 mm produced in Examples 3 and 4 was placed in a 5-liter transparent resin bag. After a test gas (air containing 50 ppm ethylene gas) was introduced into the resin bag, the photocatalyst-supporting body was illuminated by ultraviolet light (300 nm) from a xenon lamp (300 W) disposed 150 mm apart from the photocatalyst-supporting body. In either case, the content of ethylene was reduced to 5 ppm or lower within one hour of the illumination.

EXAMPLE 6

A substrate (A) of 280 μm in thickness was prepared by rolling at a rolling reduction of 30% a wire cloth of plain Dutch weave (#40/200 mesh) made of SUS316 wires.

Separately, a substrate (B) of 320 μm in thickness was prepared by rolling at a rolling reduction of 20% a wire cloth of plain Dutch weave (#40/200 mesh) made of pure aluminum wires.

In addition, a substrate (C) of 360 μm in thickness was prepared by rolling at a rolling reduction of 10% a wire cloth of plain Dutch weave (#40/200 mesh) made of a titanium alloy (PC130A) wires.

On both surfaces of each substrate, an aqueous dispersion of titanium particles having an average particle size of 250 μm was coated in a thickness of 40 μm, and then the coated product was sintered at 980° C. for 5 hours to form a porous layer having an average pore size of 100 μm. Alternatively, an aqueous dispersion of aluminum particles having an average particle size of 350 μm was coated on the surface of each substrate in thickness of 40 μm, and then the coated product was sintered at 400° C. for 5 hours to form a porous layer having an average pore size of 100 μm.

A 3:7:0.1 mixture (by weight) of a hydrosol of amorphous peroxytitanium (solid content: 0.84 weight %), a hydrosol of anatase titanium oxide (Technology of Art & Original Colors, Inc., TO Sol®; solid content: 0.84 weight %) and a colloidal silica solution (solid content: 0.84 weight %) was spray-coated on the porous layer in a coating amount of 0.7 g/25 $cm^2$ (wet basis). After dried at ordinary temperature, the spray-coated product was baked at 300° C. for one hour to obtain six types of photocatalyst-supporting bodies of the present invention.

EXAMPLE 7

The same procedures of Example 6 were repeated except for spray-coating on the porous layer a 3:3:0.1:0.3 mixture (by weight) of a hydrosol of amorphous peroxytitanium (solid content: 0.84 weight %), a hydrosol of anatase titanium oxide (Technology of Art & Original Colors, Inc., TO Sol®; solid content: 0.84 weight %), a colloidal silica solution (solid content: 0.84 weight %) and a coconut shell activated carbon in a coating amount of 0.6 g/25 cm$^2$ (wet basis), to obtain six types of photocatalyst-supporting bodies of the present invention.

EXAMPLE 8

Each of the 12 types photocatalyst-supporting bodies with a size of 110 mm×160 mm produced in Examples 6 and 7 was placed in a 5-liter transparent resin bag. After a test gas (air containing 50 ppm ethylene gas) was introduced into the resin bag, the photocatalyst-supporting body was illuminated by ultraviolet light (300 nm) from a xenon lamp (300 W) disposed 150 mm apart from the photocatalyst-supporting body. In either case, the content of ethylene was reduced to 5 ppm or lower within one hour of the illumination.

EXAMPLE 9

By using austenitic stainless steel wires, each of rolled, plain-woven wire cloths Nos. 1–4 as shown in Table 1 was prepared. Further, by using pure copper wires, titanium alloy (PC130A) wires and pure aluminum wires, each of rolled, plain-woven wire cloths Nos. 5–7 was prepared.

TABLE 1

| No. | Material of Wire | Mesh | Diameter of Wire (mm) | Opening (mm) | Open Area Ratio (%) | Rolling Reduction (%) | Thickness (mm) |
|---|---|---|---|---|---|---|---|
| 1 | SUS316 | 40 | 0.23 | 0.4 | 41 | 15 | 2.0 |
| 2 | SUS316 | 20 | 0.47 | 0.6 | 40 | 30 | 1.0 |
| 3 | SUS316 | 16 | 0.63 | 1.0 | 37 | 30 | 1.0 |
| 4 | SUS316 | 6.5 | 0.65 | 3.3 | 69 | 30 | 1.0 |
| 5 | Cu | 40 | 0.3 | 0.5 | 43 | 7 | 1.5 |
| 6 | Ti Alloy | 20 | 0.5 | 0.7 | 45 | 10 | 1.5 |
| 7 | Al | 16 | 0.5 | 0.7 | 40 | 20 | 1.5 |

On both surfaces of the wire cloths, SUS316 powder, Cu powder, Ti alloy powder or Al powder was coated and sintered to form respective porous layers while using water as the binder.

TABLE 2

| No. | Material of Metal Particles | Shape of Metal Particles | Average Particle Size (μm) | Sintering Conditions (° C.) × (h) |
|---|---|---|---|---|
| 1 | SUS316 | irregular | 30 | 960 × 2 |
| 2 | SUS316 | irregular | 25 | 960 × 2 |
| 3 | SUS316 | spherical | 30 | 960 × 2 |
| 4 | SUS316 | spherical | 25 | 960 × 2 |
| 5 | Cu | irregular | 30 | 900 × 1 |
| 6 | Ti Alloy | irregular | 45 | 980 × 5 |
| 7 | Al | irregular | 50 | 400 × 5 |

A 3:7:0.1 mixture (by weight) of a hydrosol of amorphous peroxytitanium (solid content: 0.84 weight %), a hydrosol of anatase titanium oxide (Technology of Art & Original Colors, Inc., TO Sol®; solid content: 0.84 weight %) and a colloidal silica solution (solid content: 0.84 weight %) was spray-coated on the surface of each porous layer in a coating amount of 0.7 g/25 cm$^2$ (wet basis). After dried at ordinary temperature, the spray-coated product was baked at 300° C. for one hour to obtain photocatalyst-supporting bodies Nos. 1–7.

EXAMPLE 10

The same procedures of Example 9 were repeated except for coating on the porous layer a 3:3:0.1:0.3 mixture (by weight) of drosol of amorphous peroxytitanium (solid content: 0.84 weight %), a hydrosol of anatase titanium oxide (Technology of Art & Orignal Colors, Inc., TO Sol®; solid content: 0.84 weight %), a colloidal silica solution (solid content: 0.84 weight %) and a coconut shell activated carbon in a coating amount of 0.6 g/25 cm$^2$ (wet basis), to n photocatalyst-supporting bodies Nos. 8–14.

EXAMPLE 11

Each of the photocatalyst-supporting bodies Nos. 1–14 with a size of 110 mm×160 mm produced in Examples 9 and 10 was placed in a 5-liter transparent resin bag. After a test gas (air containing 50 ppm ethylene gas) was introduced into the resin bag, the photocatalyst-supporting body was illuminated by ultraviolet light (300 nm) from a xenon lamp (300 W) disposed 150 mm apart from the photocatalyst-supporting body. In either case, the content of ethylene was reduced to 5 ppm or lower within one hour of the illumination.

What is claimed is:

1. A photocatalyst-supporting body comprising
a substrate,
a particle layer, comprising particles, fixedly disposed on at least one surface of said substrate, said particles of said particle layer being roughly formed in the vicinity of the surface of said substrate and densely formed with increasing distance from the surface of said substrate in the thickness direction of said particle layer to increase the surface area of said substrate, and
a semiconductor photocatalyst deposited on the surface of the particles of said particle layer, said substrate being a lamination of a plurality of meshed members made of metal wires.

2. The photocatalyst-supporting body according to claim 1, wherein said meshed members are made of stainless steel wires and said particles are made of stainless steel.

3. The photocatalyst-supporting body according to claim 1, wherein said meshed members are wire clothes of Dutch weave or stranded weave.

4. A photocatalytic apparatus comprising:

a photocatalyst-supporting body as defined in claim 1 having a flat plate shape; and a pair of light sources for illuminating said photocatalyst-supporting body with light having a wavelength capable of activating a photocatalyst of said semiconductor photocatalyst layer, said pair of light sources being respectively disposed along the opposite sides of said photocatalyst-supporting body so that one of said light sources illuminates a front surface of said photocatalyst-supporting body and the other illuminates a back surface of said photocatalyst-supporting body.

5. A photocatalyst-supporting body comprising a substrate, a particle layer, comprising particles, fixedly disposed on at least one surface of said substrate, said particles of said particle layer being roughly formed in the vicinity of the surface of said substrate and densely formed with increasing distance from the surface of said substrate in the thickness direction of said particle layer to increase the surface area of said substrate and a semiconductor photocatalyst layer deposited on the surface of the particles of said particle layer, wherein said photocatalyst-supporting body is formed by coating a hydrosol of peroxytitanium on the surface of said particles then depositing a sol over the surface of said particle layer to form said semiconductor photocatalyst layer.

6. The photocatalyst-supporting body according to claim 5, wherein said substrate is a meshed member made of metal wire.

7. The photocatalyst-supporting body according to claim 6, wherein said substrate is a lamination of a plurality of said meshed members.

8. The photocatalyst-supporting body according to claim 6, wherein said meshed member is made of stainless steel wires and said particles are made of stainless steel.

9. The photocatalyst-supporting body according to claim 8, wherein said meshed member is a wire cloth of Dutch weave or standard weave.

10. A photocatalytic apparatus comprising:

a photocatalyst-supporting body as defined in claim 5 having a flat plate shape; and a pair of light sources for illuminating said photocatalyst-supporting body with light having a wavelength capable of activating a photocatalyst of said semiconductor photocatalyst layer, said pair of light sources being respectively disposed along the opposite sides of said photocatalyst-supporting body so that one of said light sources illuminates a front surface of said photocatalyst-supporting body and the other illuminates a back surface of said photocatalyst-supporting body.

* * * * *